US012095888B2

United States Patent
Lee (10) Patent No.: US 12,095,888 B2
(45) Date of Patent: Sep. 17, 2024

(54) COMMUNICATION METHOD (71) Applicant: TOYOTA JIDOSHA KABUSHIKI KAISHA, Toyota (JP)

(72) Inventor: Chunghan Lee, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/229,475

(22) Filed: Aug. 2, 2023

(65) Prior Publication Data
US 2024/0056514 A1    Feb. 15, 2024

(30) Foreign Application Priority Data

Aug. 9, 2022 (JP) ................................ 2022-127317

(51) Int. Cl.
*H04L 12/24* (2006.01)
*H04L 12/12* (2006.01)
*H04L 49/00* (2022.01)
*H04L 67/02* (2022.01)
*H04L 69/18* (2022.01)
*H04L 69/322* (2022.01)

(52) U.S. Cl.
CPC .......... *H04L 69/18* (2013.01); *H04L 49/3009* (2013.01); *H04L 67/02* (2013.01); *H04L 69/322* (2013.01)

(58) Field of Classification Search
CPC ..... H04L 69/18; H04L 49/3009; H04L 67/02; H04L 69/322; H04L 12/24; H04L 12/07; H04L 12/12
USPC ........................................................ 709/203
See application file for complete search history.

(56) References Cited

U.S. PATENT DOCUMENTS

| 10,567,245 B1* | 2/2020 | Patil .................... H04L 69/22 |
| 2011/0261816 A1* | 10/2011 | Morris .................... H04L 45/00 370/392 |
| 2011/0261817 A1* | 10/2011 | Morris .................... H04L 12/12 370/392 |
| 2018/0167264 A1* | 6/2018 | Morris .................... H04L 45/22 |
| 2019/0036802 A1* | 1/2019 | Kuttuva Jeyaram ........ H04L 41/145 |

(Continued)

OTHER PUBLICATIONS

Reina Yoshitani et al.., "Design and Implementation of Multi-Layer Tracing for Microservice Environments", Mar. 2022, the 84th National Convention of Information Processing Society of Japan.

*Primary Examiner* — Jude Jean Gilles
(74) *Attorney, Agent, or Firm* — Dinsmore & Shohl LLP (57) ABSTRACT

A first module included in a first communication node executes: receiving, from a first application, a first packet that is generated in accordance with a first protocol and is generated addressed to a second communication node, adding first trace information to a predetermined region in the first packet, and passing the first packet, to which the first trace information is added, to a second layer in order to transmit the first packet to the second communication node. The first application executes deleting second trace information from a second packet that is sent from the second communication node and passing the second packet to the first application. In the case where the first application generates the first packet in response to the second packet, the first module generates, as the first trace information, information corresponding or identical to the second trace information included in the second packet.

5 Claims, 8 Drawing Sheets

(56) References Cited

U.S. PATENT DOCUMENTS

2021/0022032 A1* 1/2021 Kim ........................ H04L 69/14
2021/0022206 A1* 1/2021 Kim ...................... H04W 80/08
2022/0368565 A1* 11/2022 Asai ................... H04L 12/5601

* cited by examiner

COMMUNICATION METHOD

CROSS REFERENCE TO THE RELATED APPLICATION

This application claims the benefit of Japanese Patent Application No. 2022-127317, filed on Aug. 9, 2022, which is hereby incorporated by reference herein in its entirety.

BACKGROUND

Technical Field

The present disclosure relates to communication.

Description of the Related Art

A technique for performing distributed processing using microservices has been in widespread use in recent years. There is available distributed tracing as a mechanism for monitoring latency and the like in an application built by a microservice architecture.

As a technique related to distributed tracing, for example, a technique for performing tracing across different networking layers is disclosed in Non Patent Literature 1 (Reina Yoshitani, Chunghan Lee, and Toshio Hirotsu, "Design and implementation of multi-layer tracing for microservice environments", March 2022, the 84th National Convention of IPSJ, http://ipsj.or.jp/award/9faeag0000004ej9-att/4K-06.pdf).

SUMMARY

The present disclosure has as its object to allow distributed tracing between different networking layers.

The present disclosure in its one aspect provides a communication method, wherein a first module included in a first communication node executes receiving, from a first application, a first packet that is generated in accordance with a first protocol prescribed at a first layer in a predetermined protocol stack and is generated addressed to a second communication node, adding first trace information for data tracking between a plurality of communication nodes to a predetermined region in the first packet, and passing the first packet, to which the first trace information is added, to a second layer located lower than the first layer in order to transmit the first packet to the second communication node, before the first application generates the first packet, the first application executes deleting second trace information if the second trace information is included in the predetermined region in a second packet that is sent from the second communication node and is passed from the second layer, and passing the second packet, from which the second trace information is deleted, to the first application, and if the first application generates the first packet in response to the second packet, the first module generates, as the first trace information, information corresponding or identical to the second trace information included in the second packet.

Other aspects include a program for causing a computer to execute the above-described method or a computer-readable storage medium non-transitorily storing the program.

The present disclosure allows distributed tracing between different networking layers.

DESCRIPTION OF THE EMBODIMENTS

A microservice architecture is known. The microservice architecture is an architecture which divides an application provided to a user into a plurality of independent small-scale applications (hereinafter referred to as microservice applications) and distributedly executes the microservice applications in a plurality of nodes.

If microservice applications are distributedly executed by a plurality of nodes, it is difficult to have a bird's-eye view of the whole and track processing. To cope with this, a technique called distributed tracing is used.

In distributed tracing, information for making a tracing (hereinafter referred to as trace information) is attached to data to be sent and received between microservice applications, and each microservice application performs writing of a trace log to a storage or other things on the basis of trace information. This makes it possible to obtain, from a bird's-eye view, information on which microservice applications have a parent and child relationship and how long each execution time period is.

In distributed tracing, attachment of trace information to a header of an HTTP request to be sent and received by a microservice application is generally performed.

In the above-described system, only tracing at an identical networking layer (e.g., an application layer) is within the scope of assumption. For example, since an HTTP message is capsulated at each layer lower than the application layer, access to trace information added to an HTTP header from a networking layer other than the application layer is outside the scope of assumption.

That is, a delay and the like due to a process at the application layer (HTTP) can be evaluated, but a delay and the like due to a process at a transport layer (TCP) or a network layer (IP) are difficult to evaluate.

In order to solve the above-described problem, a technique for using trace information from a networking layer other than an application layer is known (e.g., Non Patent Literature 1). In the technique, a monitoring tool built into a kernel operates at a layer lower than the application layer, and the monitoring tool accesses trace information included in an HTTP header. This allows, for example, access to trace information from both the application layer and a transport layer and tracing across networking layers.

The above-described method, however, suffers a problem.

The problem is that trace information included in an HTTP request is laid out near the middle of an HTTP header and cannot be read at high speed.

A request URI (RequestURI) for identifying a combination of an HTTP request and an HTTP response is included in an HTTP response instead of trace information. However, since a request URI is laid out near the end of an HTTP header, it takes time to read the request URI.

Since the HTTP header has a variable length and needs to be searched in order from the beginning, an increase in data to be processed causes an increase in delay.

There is also available a method that moves an arrangement position of trace information or a request URI to a front portion of an HTTP header. If the method is adopted, a packet loses conformity to HTTP, and a different microservice application not supporting the change cannot process the packet.

That is, an attempt to access trace information from a different networking layer and analyze the trace information causes a delay. An attempt to prevent such a delay causes the problem of packet incompatibility.

A communication method according to the present disclosure solves the above-described problem.

In a communication method according to one aspect of the present disclosure, a first module included in a first communication node executes receiving, from a first application, a first packet that is generated in accordance with a first protocol prescribed at a first layer in a predetermined protocol stack and is generated addressed to a second communication node, adding first trace information for data tracking between a plurality of communication nodes to a predetermined region in the first packet, and passing the first packet, to which the first trace information is added, to a second layer located lower than the first layer in order to transmit the first packet to the second communication node, before the first application generates the first packet, the first application executes deleting second trace information if the second trace information is included in the predetermined region in a second packet that is sent from the second communication node and is passed from the second layer, and passing the second packet, from which the second trace information is deleted, to the first application, and if the first application generates the first packet in response to the second packet, the first module generates, as the first trace information, information corresponding or identical to the second trace information included in the second packet.

The first module is a proxy which transfers the first packet that is generated by the first application accordant with the first protocol and is addressed to the second communication node. For example, if the first layer is an application layer, the first module transfers a packet which is generated by an application program and is conformable to the HTTP protocol.

The first module adds trace information to the predetermined region in the first packet and passes the packet to a lower layer (e.g., a transport layer).

Note that the trace information to be added here may be a region where addition of trace information is outside the scope of assumption in terms of the first protocol. For example, as described earlier, there is no region reserved for trace information in an HTTP response, and a request URI cannot be moved to a front portion of a header. In the communication method according to the present disclosure, the first module adds trace information regardless of the restrictions and gives treatment to a back portion to compensate for the addition.

If the first module receives the second packet from the second communication node as a communication destination and is passed the second packet from a lower networking layer, the first module checks whether or not trace information is present in the second packet.

If trace information is present in the second packet, the first module deletes the trace information from the second packet and passes the second packet to the first protocol corresponding to the first layer.

That is, the first module deletes trace information added to a packet before an application program processes the packet at the first layer.

The above-described configuration gives the following two advantages.

The first one lies in that trace information added at the first layer can be accessed at high speed at a networking layer lower than the first layer. For example, since trace information can be arranged in an arbitrary region of an HTTP response, the trace information can be acquired at high speed at a layer lower than the application layer.

The second one lies in that a packet to which trace information is added is processed only at a layer located lower than the first layer and that a process at the first layer is not affected. That is, even if trace information not conformable to HTTP is added to an HTTP header, a different application which performs communication on the basis of HTTP is not affected.

Note that if the first module generates the first packet in response to the second packet, the first module generates, as the first trace information to be added to the first packet, information corresponding to the second trace information included in the second packet or information identical to the second trace information. This makes it possible to generate trace information while a correspondence relationship between a request and a response is maintained.

At the second layer, a different proxy module which performs tracing may operate using added trace information. For example, a third module may operate at the transport layer or a network layer of the first node or a fourth module which performs the same processing may operate in the second node.

These modules may generate a trace log for TCP or IP on the basis of the trace information and write the trace log to a storage.

The third and fourth modules may be run by eBPF (Extended Berkeley Packet Filter). eBPF is a technique capable of executing an arbitrary program at the kernel level without changing source code of an OS kernel or adding a module. This makes it possible to read and write data at a networking layer lower than an application layer.

Specific embodiments of the present disclosure will be described below with reference to the drawings. Hardware configurations, module configurations, functional configurations, and the like described in the embodiments are not intended to limit the technical scope of the disclosure thereto unless otherwise described.

First Embodiment

An embodiment of the present disclosure will be described below with reference to the drawings.

An information processing system according to the present embodiment is a system in which a plurality of nodes (information processing apparatuses) distributedly execute particular information processes.

The information processing system according to the present embodiment distributedly executes tasks by communication of a plurality of information processing apparatuses 100 with each other. Each of the plurality of information processing apparatuses 100 may be a fixed computer or a computer which moves. For example, mounting of the information processing apparatus 100 on each automobile allows a plurality of vehicles running around the automobile to distributedly process tasks generated during running.

In each of the plurality of information processing apparatuses 100, a microservice application programmed to process a predetermined task is executed. Such an architecture is called a microservice architecture.

In the information processing system according to the present embodiment, the information processing apparatus 100 as a parent node asks a different information processing apparatus 100 located lower to process a task. The information processing apparatus 100 asked to process the task can ask another different information processing apparatus 100 to process (a part or the whole of) the task. Division of a task may be performed by any apparatus. The information processing apparatuses may be ones which execute respective different types of tasks.

When execution of a task is complete, each node returns a processing result to a parent node. With this return, a final processing result is transmitted to the information processing apparatus 100.

As a foundation which allows the above-described processing, Kubernetes is known. In Kubernetes, a plurality of microservices operate in a pod. In a computer on which Kubernetes operates, a virtual network interface is operating, and a unique IP address is assigned to a pod. Sending of an HTTP-based request to a pod makes it possible to ask each microservice to process a task.

In order to analyze performance of the above-described system, it is necessary to record when a microservice application starts/ends a task, which microservice application the microservice application is, and which task the task is. For this reason, a method which adds information for tracing (trace information) at the time of transmission and reception of a task and a processing result and in which a module configured to process the trace information performs logging on the basis of the information is used. This is called distributed tracing. As described above, under a communication protocol which sends and receives a request or a response by the HTTP protocol, trace information can be stored in an HTTP header.

Information for performing tracing is included in trace information. Examples of such information include a trace identifier, a span identifier, a parent span identifier, or a node identifier. Writing a trace log to a common storage on the basis of the information makes it possible to have a bird's-eye view of how a target application is divided, and by which microservice applications and when the target application is processed.

Figure 1:
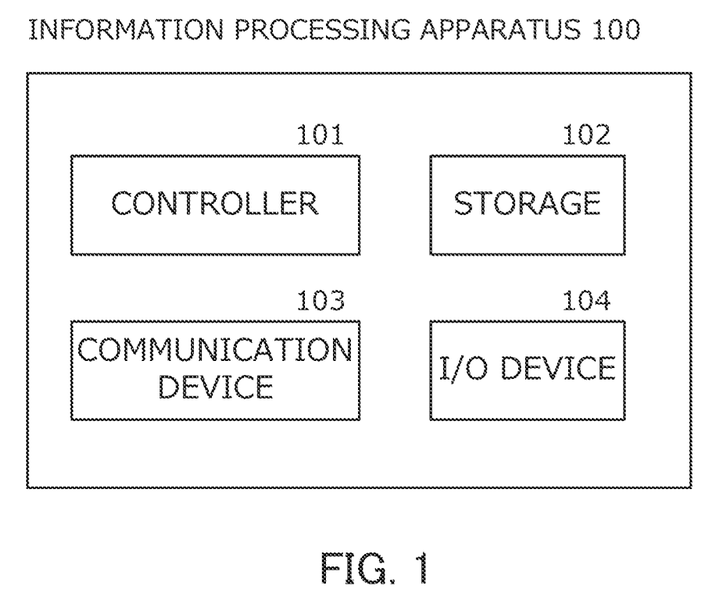
FIG. 1 is a diagram of a system configuration of an information processing apparatus according to the present embodiment.

A configuration of the information processing apparatus 100 according to the present embodiment will be described with reference to FIG. 1.

The information processing apparatus 100 has a controller 101, a storage 102, a communication device 103, and an I/O device 104.

The information processing apparatus 100 can be configured as a computer having a CPU (arithmetic processing device), a main memory, and an auxiliary memory. Note that all or some of illustrated functions may be executed using a specifically designed circuit.

The controller 101 is an arithmetic unit which implements various types of functions of the information processing apparatus 100 by executing a predetermined program. The controller 101 may be implemented by the CPU or the like.

The storage 102 is a unit for storing information and is composed of a storage medium, such as a RAM, a magnetic disk, or a flash memory. Various types of programs to be executed in the controller 101, data to be used by the programs, and the like are stored in the storage 102.

The communication device 103 is a communication interface for connecting the information processing apparatus 100 to a network. If the information processing apparatus 100 is movable, an interface for wireless communication can be adopted as the communication device 103. The communication device 103 is configured to include, for example, a network interface board or a wireless communication interface for wireless communication.

The I/O device 104 is a device which inputs and outputs information. Specifically, the I/O device 104 is configured to include a display, a touch panel, a keyboard, and the like. The touch panel and the display are made up of one touch panel display in the present embodiment. The I/O device 104 may include a unit (an amplifier or a speaker) which outputs sound, and the like.

Generally, a microservice operates on the top (an application layer) of a plurality of networking layers. A packet generated by a given microservice passes through lower networking layers and arrives at a physical layer. The packet that is sent to a target information processing apparatus passes through a plurality of networking layers and arrives at an application layer, at which a microservice operates.

Proxies which operate at networking layers can log processes at the networking layers by referring to trace information.

Figure 2A:
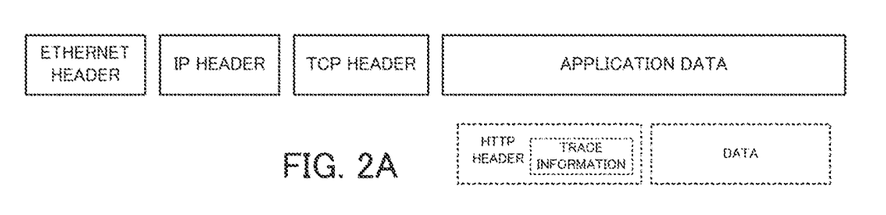
FIG. 2A is a schematic diagram of a frame to be sent from an information processing apparatus 100A.

FIG. 2A is a schematic diagram of a frame to be sent from the information processing apparatus 100. In the present embodiment, a plurality of microservices send and receive data by the HTTP protocol. That is, an HTTP header and data are included in application data. Tracing at an application layer can be performed by inserting information for distributed tracing (hereinafter referred to as trace information) into an HTTP header.

However, referring to data capsulated at the application layer from a networking layer (e.g., a transport layer) lower than the application layer is outside the scope of assumption. Although it is possible to refer to an HTTP header from a lower networking layer, a problematic situation where passage of many packets causes a delay in processing can occur as described earlier.

To solve the above-described problem, the information processing apparatus 100 according to the present embodiment adds, at the application layer, information for performing tracing at a lower networking layer by a method different from a conventional one.

Figure 3:
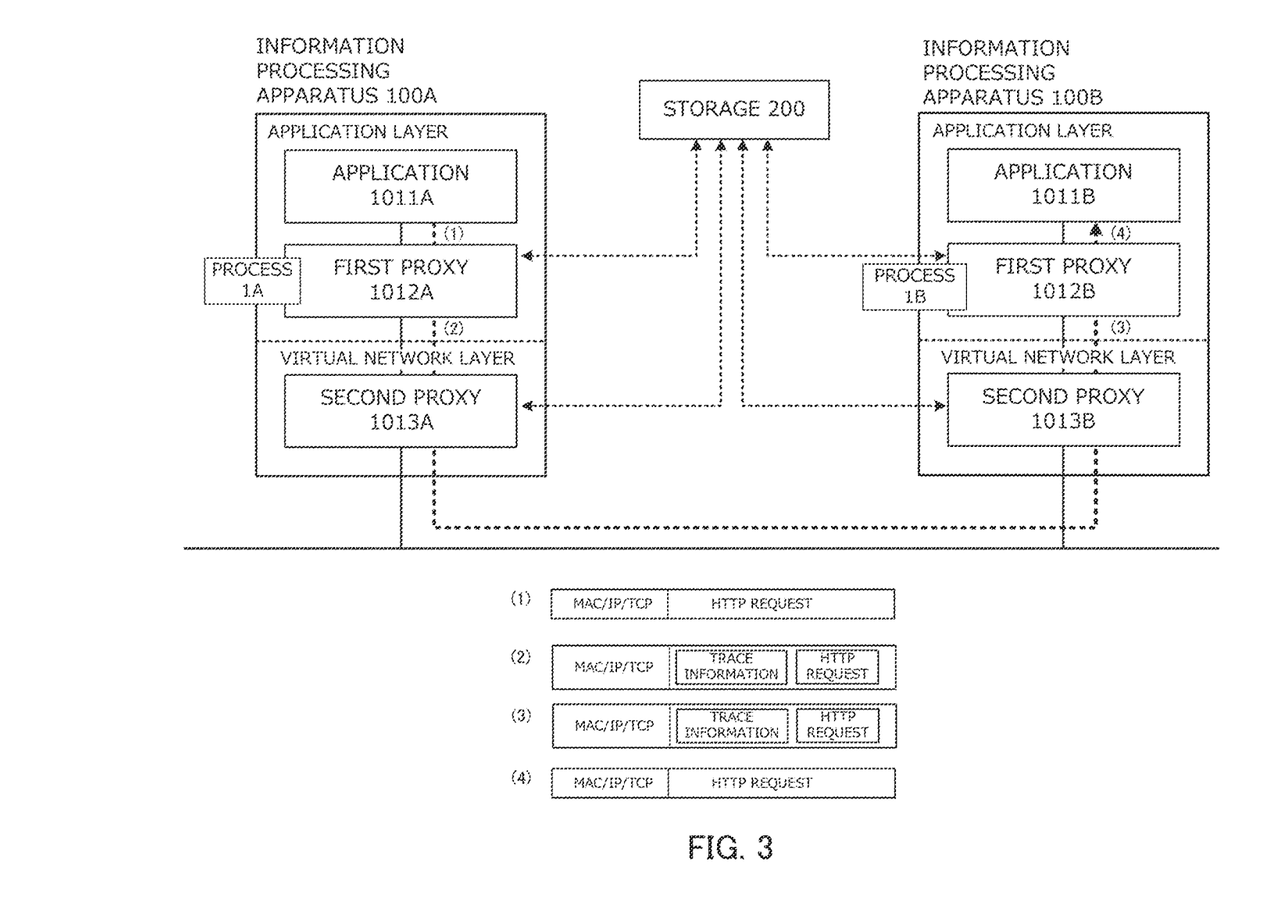
FIG. 3 is a diagram for explaining sending of a request from the information processing apparatus 100A to an information processing apparatus 100B.
Figure 4:
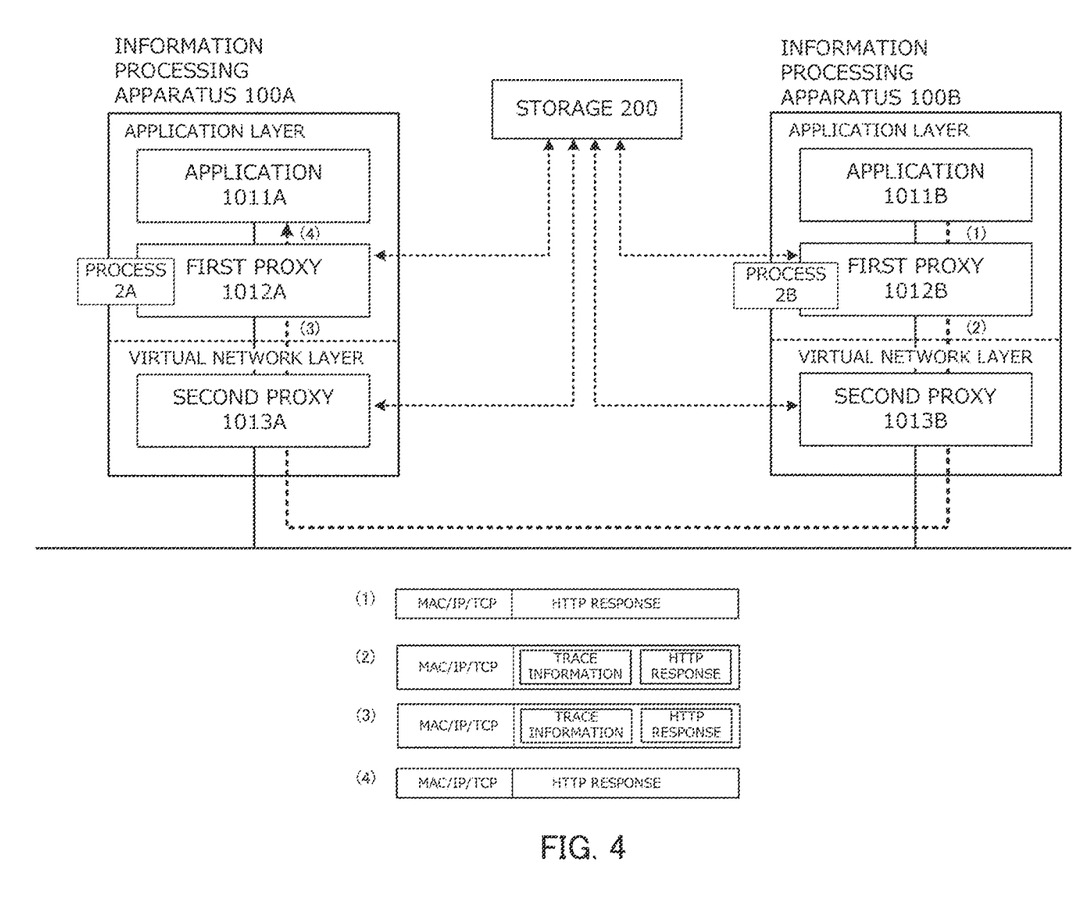
FIG. 4 is a diagram for explaining sending of a response from the information processing apparatus 100B to the information processing apparatus 100A.

FIGS. 3 and 4 are diagrams for explaining a connection relationship between a plurality of modules operating in the information processing apparatus 100. Although a distinction is made by calling an apparatus which makes a request to process a task an information processing apparatus 100A and an apparatus which receives the request, executes the task, and returns a response an information processing apparatus 100B, the both apparatuses are apparatuses (the information processing apparatuses 100) having the same configurations.

The information processing apparatus 100B is an example of a first communication node. In this case, the information processing apparatus 100A is an example of a second communication node.

Note that the information processing apparatuses 100A and 100B are configured to be capable of communication with a storage 200 which manages a trace log. In the following description, logging refers to writing a trace log to the storage 200.

As illustrated, an application 1011A, a first proxy 1012A, and a second proxy 1013A operate as functional modules in the information processing apparatus 100A. An application 1011B, a first proxy 1012B, and a second proxy 1013B operate as functional modules in the information processing apparatus 100B.

Note that a proxy in the present embodiment refers to a module which relays data. The proxy in the present embodiment need not have functions, such as proxy access, data caching, and filtering.

Note that a virtual network layer is given as an example of a networking layer lower than an application layer in the present embodiment. However, if a virtual network is not operating in a target computer, a virtual network layer can be replaced with a transport layer, a network layer, a datalink layer, or the like.

Note that the application 1011A and the application 1011B, the first proxy 1012A and the first proxy 1012B, and the second proxy 1013A and the second proxy 1013B are each identical modules. If there is no need to make a distinction between a request-sending side and a receiving side, the application 1011A and the application 1011B, the first proxy 1012A and the first proxy 1012B, and the second proxy 1013A and the second proxy 1013B are called applications 1011, first proxies 1012, and second proxies 1013, respectively. Each module is executed on the controller 101 by software.

Each second proxy 1013 may be run by eBPF (Extended Berkeley Packet Filter). eBPF is a technique capable of executing an arbitrary program at the kernel level without changing source code of an OS kernel or adding a module. This makes it possible to read and write application data at a networking layer lower than an application layer.

FIG. 3 is a diagram for explaining sending of a request from the information processing apparatus 100A to the information processing apparatus 100B, and FIG. 4 is a diagram for explaining sending of a response from the information processing apparatus 100B to the information processing apparatus 100A.

First, sending of a request will be described with reference to FIG. 3.

The application 1011A is application software in which a microservice is executed. The application 1011A executes a process of executing a task requested by a higher-layer microservice application, a process of requesting a lower-layer microservice application to execute a task, and a process of generating application data in conformity to a protocol of an application layer. In the present example, the application 1011A adopts HTTP as the protocol of the application layer and requests a different node to execute a task via an HTTP request.

Each first proxy 1012 relays a packet which flows between a lower networking layer and the application 1011.

Additionally, the first proxies 1012 execute the following processes.

(Process 1A) A process (to be executed by the first proxy 1012A) of adding trace information to a packet (HTTP request) and performing logging at the application layer if the packet is passed from the application 1011A (Process 1B) A process (to be executed by the first proxy 1012B) of performing logging at an application layer and deleting the trace information if the packet (HTTP request) is passed from a virtual network layer First, the process 1A will be described. As indicated by (1) in FIG. 3, a packet (HTTP request) requesting processing from a different microservice application is sent from the application 1011A. The first proxy 1012A inserts trace information into an HTTP header. (2) in FIG. 3 is an example of a packet into which the trace information is inserted. A position where the trace information is to be inserted need not be one conformable to the HTTP protocol. That is, the position can be set at an arbitrary position in a front portion in the header.

The first proxy 1012A also performs logging on the basis of content of the trace information. That is, writing of a trace log to the storage 200 is performed at the application layer.

The packet, into which the trace information is inserted, is passed to the second proxy 1013A. The second proxy 1013A performs logging on the basis of the inserted trace information. That is, writing of a trace log to the storage 200 is performed at a virtual network layer. This allows recording of a delay due to TCP or IP, and the like. Although the second proxy 1013A refers to application data capsulated at the application layer and accesses the trace information, since the trace information is in a front portion of the data, it is possible to access the trace information within a short time period.

The packet, into which the trace information is inserted, arrives at the information processing apparatus 100B on the receiving side via the network and is processed in the second proxy 1013B.

The second proxy 1013B similarly performs logging on the basis of the inserted trace information. That is, writing of a trace log to the storage 200 is performed at the virtual network layer.

The process 1B will be described. A packet to be received by the first proxy 1012B of the information processing apparatus 100B is one into which the trace information is inserted, as indicated by (3) in FIG. 3.

First, the first proxy 1012B performs logging on the basis of the trace information. That is, writing of a trace log to the storage 200 is performed at the application layer.

However, if the trace information is left, the application 1011B cannot normally process the packet. This is because the trace information is inserted at a position not conformable to the HTTP protocol.

For this reason, the first proxy 1012B deletes the trace information before passing the packet to the application 1011B. This makes a packet to be passed to the application 1011B identical to the packet generated by the source application 1011A, as indicated by (4) in FIG. 3.

Sending of a response will be described with reference to FIG. 4.

The application 1011B executes a task in response to the request (HTTP request) sent from the application 1011A and generates a response (HTTP response). The application 1011B operates at the application layer, like the application 1011A, and performs sending and reception of data by the HTTP protocol.

The first proxies 1012 that have received the HTTP response execute the following processes.

(Process 2B) A process (to be executed by the first proxy 1012B) of adding trace information to a packet (HTTP response) and performing logging at the application layer if the packet is passed from the application 1011B (Process 2A) A process (to be executed by the first proxy 1012A) of performing logging at the application layer and deleting the trace information if a packet (the HTTP response) is passed from the virtual network layer First, the process 2B will be described. As indicated by (1) in FIG. 4, a packet (HTTP response) corresponding to a task processing result is sent from the application 1011A. The first proxy 1012B inserts trace information into an HTTP header. (2) in FIG. 4 is an example of a packet into which the trace information is inserted. A position where the trace information is to be inserted can be set at the same position as in the process 1A. The first proxy 1012B also performs logging on the basis of content of the trace information.

The packet, into which the trace information is inserted, is passed to the second proxy 1013B. The second proxy 1013B performs logging on the basis of the inserted trace information. The second proxy 1013B can also access the trace information within a short time period, like the one described earlier.

The packet, into which the trace information is inserted, arrives at the information processing apparatus 100A on the receiving side via the network and is processed in the second proxy 1013A.

The second proxy 1013A similarly performs logging on the basis of the inserted trace information.

The process 2A will be described. A packet to be received by the first proxy 1012A of the information processing apparatus 100A is one into which the trace information is inserted, as indicated by (3) in FIG. 4. First, the first proxy 1012A performs logging on the basis of the trace information.

The first proxy 1012A deletes the trace information before passing the packet to the application 1011A. This makes the packet to be passed to the application 1011A identical to the packet generated by the source application 1011B, as indicated by (4) in FIG. 4.

Flowcharts of processes to be executed by the first proxies 1012 will be described.

The processes to be executed by the first proxies 1012 can be classified into four types, the processes 1A, 1B, 2A, and 2B, as described earlier.

Figure 5:
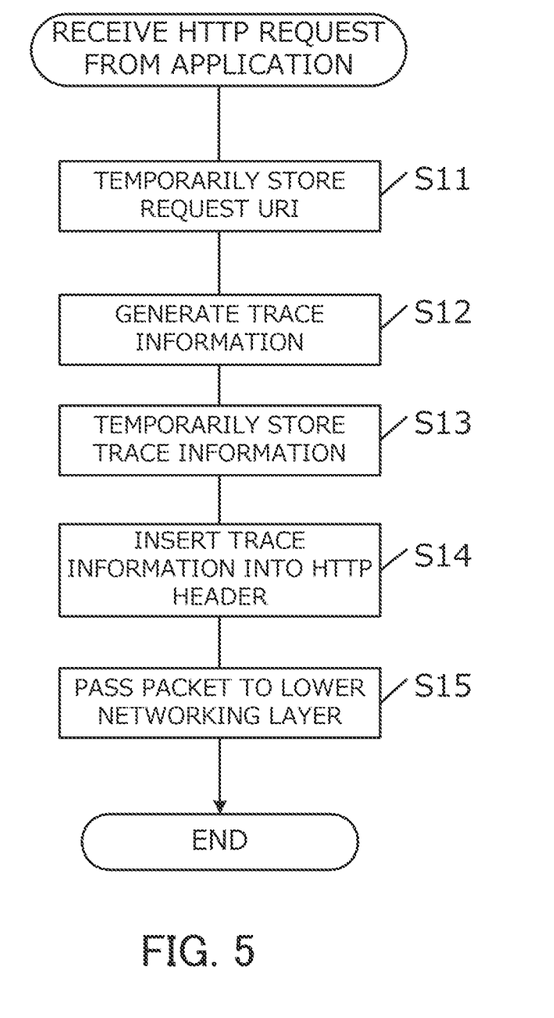
FIG. 5 is a flowchart of a process 1A to be executed by a first proxy.

Process 1A: A process of adding trace information to an HTTP request
Process 1B: A process of removing the trace information from the HTTP request
Process 2B: A process of adding trace information to an HTTP response
Process 2A: A process of removing the trace information from the HTTP response FIG. 5 is a flowchart of the process 1A. The illustrated process is started when the first proxy 1012A receives an HTTP request from the application 1011A.

First, in step S11, a request URI included in a header (HTTP header) of the received HTTP request is temporarily stored. This is to identify a combination of the HTTP request and an HTTP response corresponding thereto. The stored request URI is used when an HTTP response is received in the process 2A.

In next step S12, trace information is generated. The trace information includes, for example, a trace identifier, a span identifier, a parent span identifier, a node identifier, or the like.

In next step S13, the generated trace information is temporarily stored. In step S14, the generated trace information is inserted into the HTTP header. As described earlier, a position where the trace information is to be inserted can be arbitrarily determined.

When the above-described processes are complete, a target packet is passed to a lower networking layer in step S15. The first proxy 1012A performs logging on the basis of the trace information. This makes it possible to record a timing of sending of the HTTP request generated by the application 1011A.

Figure 6:
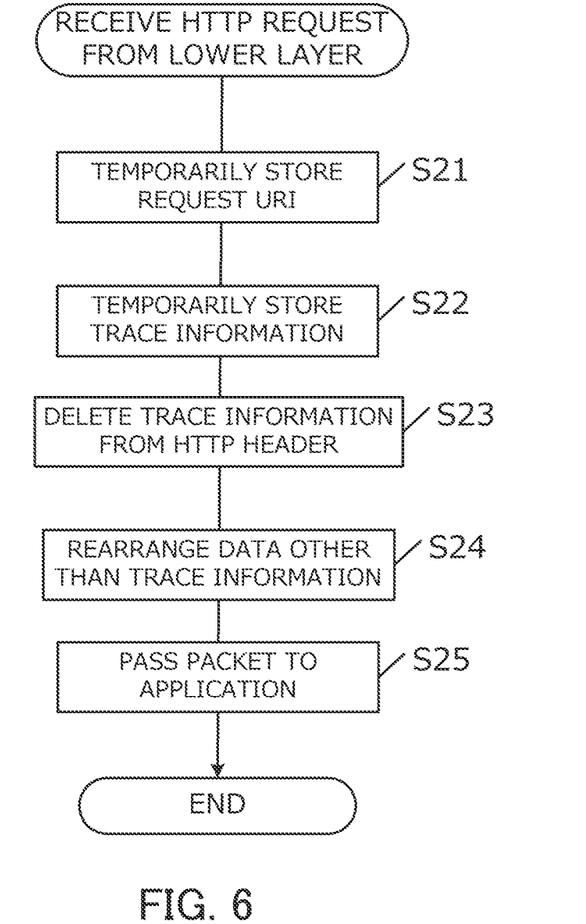
FIG. 6 is a flowchart of a process 1B to be executed by a first proxy.

FIG. 6 is a flowchart of the process 1B. The illustrated process is started when the first proxy 1012B receives the HTTP request from a lower networking layer (the second proxy 1013B).

First, in step S21, the request URI included in the header (HTTP header) of the received HTTP request is temporarily stored. This is to identify a combination of the HTTP request and an HTTP response corresponding thereto. The stored request URI is used when an HTTP response is received in the process 2B.

In next step S22, the trace information (an example of first trace information) included in the header is acquired and is temporarily stored. This is to generate trace information when an HTTP response is returned from the application 1011B.

In next step S23, the trace information is deleted from the header of the received HTTP request. In step S24, data other than the trace information is rearranged. With this rearrangement, a target packet returns to a state before execution of the process 1A.

When the above-described processes are complete, the target packet is passed to the application 1011B in step S25.

The first proxy 1012B performs logging on the basis of the trace information. This makes it possible to record a timing of starting of processing of the HTTP request by the application 1011B.

Figure 7:
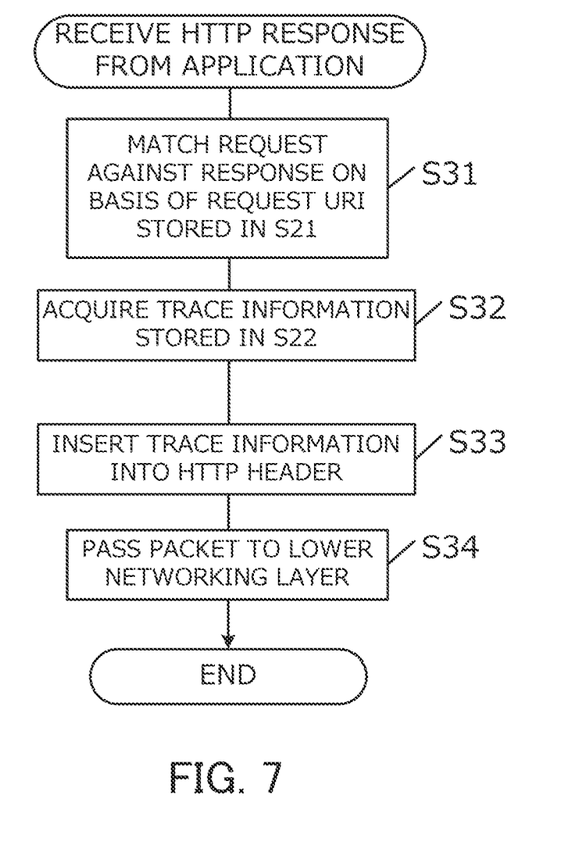
FIG. 7 is a flowchart of a process 2B to be executed by the first proxy.

FIG. 7 is a flowchart of the process 2B. The illustrated process is started when the first proxy 1012B receives an HTTP response from the application 1011B.

First, in step S31, the HTTP request is matched against the HTTP response on the basis of the request URI temporarily stored in step S21 and a request URI included in the HTTP response. With this matching, a combination of the HTTP request and the HTTP response is identified.

In next step S32, the trace information temporarily stored in step S22 is acquired. In step S33, trace information is generated on the basis of the acquired trace information, and the generated trace information is inserted into a header of the HTTP response. The trace information (an example of second trace information) to be generated in the present step may be a complete copy of the trace information stored in step S22 or may be one including a part of the trace information stored in step S22. The trace information to be generated in the present step only needs to be one indicating a correspondence relationship with the trace information stored in step S22. As described earlier, a position where the trace information is to be inserted can be arbitrarily determined.

When the above-described processes are complete, a target packet is passed to a lower networking layer in step S34. The first proxy 1012B performs logging on the basis of the trace information. This makes it possible to record a timing of sending of the HTTP response generated by the application 1011B.

Figure 8:
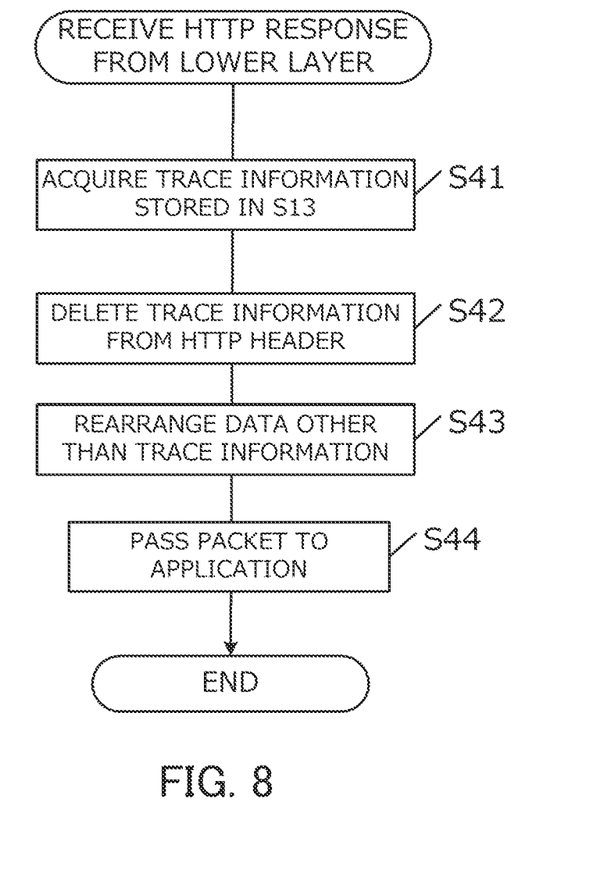
FIG. 8 is a flowchart of a process 2A to be executed by the first proxy.

FIG. 8 is a flowchart of the process 2A. The illustrated process is started when the first proxy 1012A receives the HTTP response from a lower networking layer (the second proxy 1013A).

First, in step S41, the trace information temporarily stored in step S13 is acquired and is matched against the trace information included in the header (HTTP header) of the received HTTP response. If the pieces of trace information match, the trace information is deleted from the header of the received HTTP response in step S42. In step S43, data other than the trace information is rearranged. With this rearrangement, a target packet returns to a state before execution of the process 2A.

When the above-described processes are complete, the target packet is passed to the application 1011A in step S44.

The first proxy 1012A performs logging on the basis of the trace information. This makes it possible to record a timing of starting of processing of the HTTP response by the application 1011A.

As has been described above, in the information processing apparatus according to the present embodiment, the first proxy 1012 operating at the application layer performs the above-described processing, i.e., addition and deletion of trace information between the application 1011 and the second proxy 1013 operating at the virtual network layer. This makes it possible to perform tracing between different networking layers without affecting a different service (a microservice provided by the application 1011) operating at the application layer.

(Modification of First Embodiment)

Figure 2B:
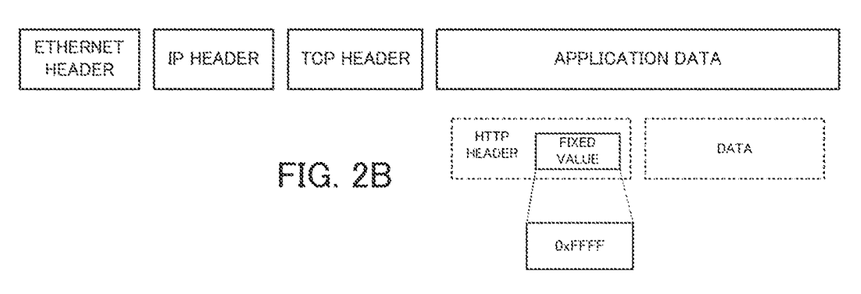
FIG. 2B is a schematic diagram of another frame to be sent from the information processing apparatus 100A.

Although a trace identifier, a span identifier, a parent span identifier, a node identifier, or the like is given as an example of trace information in the first embodiment, the trace information may be any one or a combination of any two of these. Additionally, if a task flow is trackable, the trace information may be a fixed value. FIG. 2B is an example of a case where a fixed value is adopted as trace information. An arbitrary value (e.g., 0xFFFF) can be adopted as the fixed value as long as the fixed value can be identified in a back portion. The length of the fixed value can be arbitrarily determined.

Figure 2C:
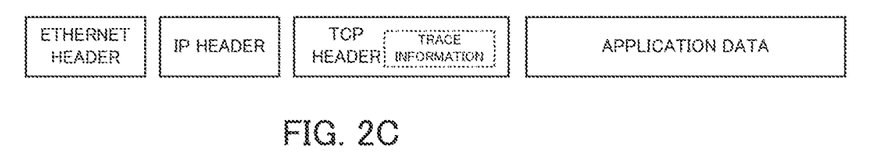
FIG. 2C is a schematic diagram of still another frame to be sent from the information processing apparatus 100A.
Figure 2D:
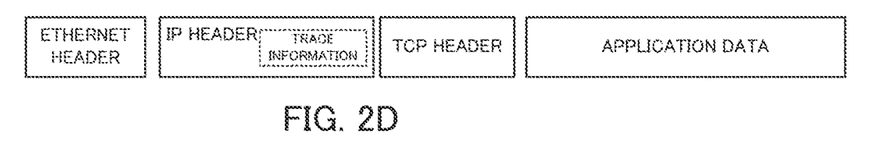
FIG. 2D is a schematic diagram of still another frame to be sent from the information processing apparatus 100A.

Although two of an application layer and a virtual network layer are given as an example of different networking layers in the first embodiment, the present disclosure can be applied to a system using networking layers other than these. For example, trace information may be added at a transport layer such that the trace information can be referred to from a lower networking layer (e.g., a network layer). In this case, trace information may be inserted into an arbitrary region of a TCP (UDP) header, as illustrated in, for example, FIG. 2C. Alternatively, for example, trace information may be added at the network layer such that the trace information can be referred to from a lower networking layer (e.g., a data link layer). In this case, trace information may be inserted into an arbitrary region of an IP header, as illustrated in, for example, FIG. 2D.

Although the HTTP protocol is given as an example of a protocol used at an application layer in the first embodiment, one other than the HTTP protocol can also be adopted as long as the one is a protocol in which a request and a response are paired.

In any case, if trace information is inserted at a given networking layer, the trace information only needs to be removed at a timing before a packet is passed to a different application operating at the networking layer.

Although an example where one application operates in one node has been given in the first embodiment, the number of applications which operate in a given node may be two or more. In this case, first proxies, the number of which is equal to the number of applications, may be present.

(Other Modifications)

The above-described embodiment is merely an example, and the present disclosure can be appropriately changed and carried out without departing from the spirit thereof.

For example, the processes described in the present disclosure can be freely combined and carried out as long as there is no technical contradiction.

Processing described as being performed by one apparatus may be shared and executed by a plurality of apparatuses. Or alternatively, processing described as being performed by different apparatuses may be executed by one apparatus. In a computer system, what hardware configuration (server configuration) each function is realized by can be flexibly changed.

The present disclosure can be realized by supplying a computer program implemented with the functions described in the above embodiments to a computer, and one or more processors that the computer has reading out and executing the program. Such a computer program may be provided for the computer by a non-transitory computer-readable storage medium connectable to a system bus of the computer or may be provided for the computer via a network. As the non-transitory computer-readable storage medium, for example, a disk of a given type such as a magnetic disk (a floppy (R) disk, a hard disk drive (HDD) and the like) and an optical disc (a CD-ROM, a DVD disc, a Blu-ray disc and the like), a read-only memory (ROM), a random-access memory (RAM), an EPROM, an EEPROM, a magnetic card, a flash memory, an optical card, and a medium of a given type that is appropriate for storing electronic commands are included.

What is claimed is:

1. A communication method comprising:
   a first module included in a first communication node, the first module executes
   receiving, from a first application, a first packet that is generated in accordance with a first protocol prescribed at a first layer in a predetermined protocol stack and is generated addressed to a second communication node,
   adding first trace information for data tracking between a plurality of communication nodes to a predetermined region in the first packet, and
   passing the first packet, to which the first trace information is added, to a second layer located lower than the first layer in order to transmit the first packet to the second communication node,
   before the first application generates the first packet, the first application executes:
     determining whether a second packet from a second communication node is passed from a lower networking layer and whether or not a second trace information is present in the second packet,
     when the second trace information is present in the second packet that is sent from the second communication node and is passed from the second layer, the first module deleting the second trace information and
     passing the second packet, from which the second trace information is deleted, to the first application corresponding to the first layer, and
   when the first application generates the first packet in response to the second packet, the first module generates, as the first trace information, information corresponding or identical to the second trace information included in the second packet.

2. The communication method according to claim 1, wherein the predetermined region is a region where arrangement of trace information is outside a scope of assumption in terms of the first protocol.

3. The communication method according to claim 2,
wherein the first module stores a trace log related to the data tracking in a predetermined storage.

4. The communication method according to claim 3,
wherein a second module included in the first communication node stores, at the second layer, a log related to the data tracking in the storage on the basis of the first trace information and the second trace information included in the first and second packets capsulated at the first layer.

5. The communication method according to claim 1,
wherein the first protocol is HTTP (Hypertext Transfer Protocol), and
the predetermined region is a header region of HTTP.

* * * * *